A. R. SILVER.
Meat-Choppers.
No. 141,731. Patented August 12, 1873.
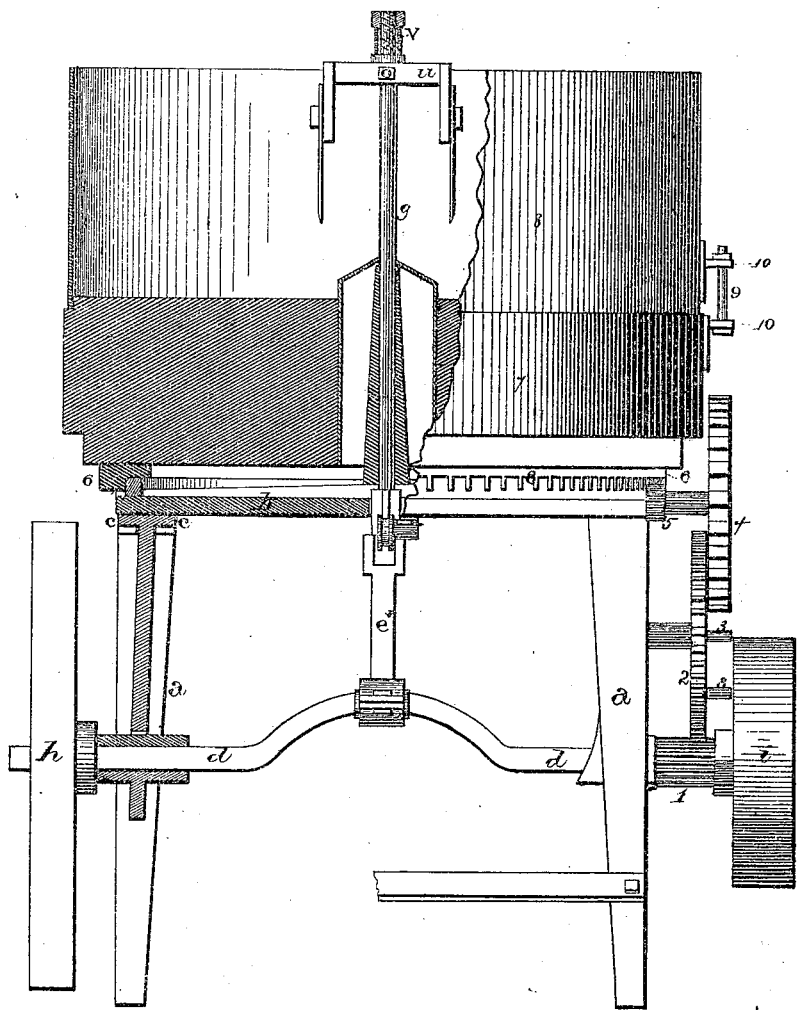
WITNESSES. INVENTOR.

UNITED STATES PATENT OFFICE.

ALBERT R. SILVER, OF SALEM, OHIO, ASSIGNOR OF ONE-HALF HIS RIGHT TO JOHN DEMING, OF SAME PLACE.

IMPROVEMENT IN MEAT-CHOPPERS.

Specification forming part of Letters Patent No. 141,731, dated August 12, 1873; application filed May 21, 1873.

*To all whom it may concern:*

Be it known that I, ALB. R. SILVER, of Salem, county of Columbiana and State of Ohio, have invented certain new and useful Improvements in Meat-Cutters, of which the following is a specification:

The nature of my invention relates to an improvement in meat-cutters; and it consists in, first, the legs or standards, cast in one piece and provided with suitable flanges for securing them to the bed-piece, and boxes for the driving-shaft; second, an intermediate gear-wheel placed between the driving-shaft and the feed or stop wheel, and which communicates an intermittent motion to the hopper; third, the devices, consisting of ears and screw-bolts for securing the hopper to the block; fourth, the general arrangement and combination of parts, which will be more fully described hereafter.

The accompanying drawing, partly in section, represents my invention.

$a$ represents the legs or standards, cast in a single piece, and provided with the flanges $c$, by which they are bolted or secured to the bed-piece $b$, and suitable boxes for the crank-shaft $d$. To the center of this shaft is attached the pitman $e$ for operating the knife-rod $g$, and to the ends are secured the fly-wheel $h$ and pulley or driving-wheel $i$. Upon the same end of the shaft as the wheel $i$ is the wheel or pinion 1, which meshes with the gear-wheel 2, journaled upon the leg or standard. Upon the front of this wheel are formed several pins or projections, 3, which catch in the teeth of the wheel 4, so as to cause it an intermittent motion. Upon the inner end of the shaft to which the wheel 4 is secured is the pinion 5, which meshes with the teeth or circular rack 6 on the under side of the block 7, and causes it to rotate. The hopper 8 is secured to the top of the block by means of the screw-bolts and nuts 9 and the ears 10, formed upon both the hopper and block, and which make a very effective and simple fastening. The knives are held in position upon the knife-shaft by means of the set-screw $o$, which allows them to be lowered as the block wears away. Upon the top of the shaft is formed a screw-thread, upon which is screwed the nut $v$, smaller on the inside at the top than the bottom, so as to pass over the thread and follow the knife down, and hold the arch $u$ firm and steady. The knife-shaft is provided with a suitable guide and two or more grooved friction rollers, so as to keep it perfectly straight and lessen the friction.

Having thus described my invention, what I claim as new, and desire to secure by Letters Patent, is—

1. The combination of the block 7 provided with circular rack 6, sprocket and side sprocket-wheels 4 and 2, and crank-shaft $d$, arranged and operating so as to give the hopper an intermittent motion.

2. The screw-nut $v$ upon the top of the knife-shaft, having a loose sleeve extending beneath over the thread and following the knife down substantially as set forth.

3. The combination of the crank-shaft $d$, pitman $e$, knife-shaft $g$ provided with knives, and block 7 operated by suitable gearing, substantially as shown and described.

In testimony that I claim the foregoing as my invention I hereunto affix my signature this 8th day of May, 1873.

ALBERT R. SILVER.

Witnesses:
    WILLIAM KELLY,
    PETER AMBLER.